(12) United States Patent
Burk et al.

(10) Patent No.: US 10,978,905 B2
(45) Date of Patent: Apr. 13, 2021

(54) SYSTEM AND METHOD FOR CONTROLLING AUXILIARY POWER SUPPLY

(71) Applicant: Current Lighting Solutions, LLC, East Cleveland, OH (US)

(72) Inventors: Jessica Lynn Burk, Mayfield Heights, OH (US); David Joseph Tracy, Cleveland Heights, OH (US); Nina Rose Scheidegger, Cleveland, OH (US); Matthew Heida, Mentor, OH (US); Tamas Istvan Vegh, Budapest (HU)

(73) Assignee: Current Lighting Solutions, LLC, East Cleveland, OH (US)

( * ) Notice: Subject to any disclaimer, the term of this patent is extended or adjusted under 35 U.S.C. 154(b) by 117 days.

(21) Appl. No.: 15/970,473

(22) Filed: May 3, 2018

(65) Prior Publication Data

US 2019/0341802 A1 Nov. 7, 2019

(51) Int. Cl.
  *H02J 9/06* (2006.01)
  *H02J 9/08* (2006.01)

(52) U.S. Cl.
  CPC ............. *H02J 9/061* (2013.01); *H02J 9/08* (2013.01)

(58) Field of Classification Search
  CPC .................................. H02J 9/061; H02J 9/08
  See application file for complete search history.

(56) References Cited

U.S. PATENT DOCUMENTS

| 8,531,125 | B2 * | 9/2013 | Kim .................... G09G 3/3406 |
| | | | 315/279 |
| 9,373,965 | B2 | 6/2016 | Liu et al. |
| 9,379,579 | B2 * | 6/2016 | Kinnard ................. H02J 9/061 |
| 10,616,970 | B2 * | 4/2020 | Johnson ................ H05B 45/00 |
| 2006/0174145 | A1 | 8/2006 | Chapuis et al. |
| 2008/0054722 | A1 * | 3/2008 | Phelps ................... H02J 9/061 |
| | | | 307/64 |
| 2010/0084918 | A1 | 4/2010 | Fells et al. |
| 2010/0327765 | A1 | 12/2010 | Melanson et al. |

(Continued)

FOREIGN PATENT DOCUMENTS

| KR | 10-0900769 B1 | 6/2009 |
| KR | 10-2014-0065573 A | 5/2014 |

OTHER PUBLICATIONS

International Search Report and Written Opinion dated Aug. 12, 2019 which was issued in connection with PCT Application No. PCT/US19/30416 which was filed on May 2, 2019.

(Continued)

*Primary Examiner* — Jared Fureman
*Assistant Examiner* — Emmanuel Dominique
(74) *Attorney, Agent, or Firm* — Buckley, Maschoff & Talwalkar LLC

(57) ABSTRACT

There are provided systems, apparatuses, and methods for controlling power delivery from an auxiliary power supply. For example, there is provided a method that includes generating a first random number to define a timeout period. During the timeout period, the method may detect whether a voltage is present at an output of an auxiliary power supply, may disable the auxiliary power supply when the voltage is detected at the output, and may enable the auxiliary power supply when the voltage is not detected at the output.

17 Claims, 4 Drawing Sheets

(56) References Cited

U.S. PATENT DOCUMENTS

| | | | |
|---|---|---|---|
| 2011/0115399 A1* | 5/2011 | Sadwick | H05B 45/37 |
| | | | 315/287 |
| 2011/0255315 A1* | 10/2011 | Ono | H02M 3/33523 |
| | | | 363/49 |
| 2013/0038250 A1* | 2/2013 | Wu | H02P 1/54 |
| | | | 318/102 |
| 2013/0113288 A1* | 5/2013 | Chen | H02J 9/06 |
| | | | 307/64 |
| 2014/0240966 A1* | 8/2014 | Garcia | H02J 9/02 |
| | | | 362/183 |
| 2014/0361623 A1* | 12/2014 | Siessegger | H01L 25/167 |
| | | | 307/64 |
| 2015/0351205 A1 | 12/2015 | Clark et al. | |
| 2016/0198541 A1 | 7/2016 | Tikkanen et al. | |
| 2017/0244249 A1 | 8/2017 | Marinus et al. | |
| 2019/0181629 A1* | 6/2019 | Burk | H05B 47/105 |

OTHER PUBLICATIONS

Burk, J. L., et al., System and method for managing power consumption during a fault condition, GE Co-Pending U.S. Appl. No. 62/595,741, filed Dec. 7, 2017.

* cited by examiner

SYSTEM AND METHOD FOR CONTROLLING AUXILIARY POWER SUPPLY

TECHNICAL FIELD

The present disclosure relates to managing power delivery in circuit and system modules. More particularly, the present disclosure relates to methods and systems for controlling power delivery from auxiliary power supplies.

BACKGROUND

Auxiliary power supplies may be used in a wide variety of applications. For example, these circuit modules may provide power to a load when the load fails to receive power (or enough power for its requirements) from another power source.

For example, an auxiliary power supply may be used with a driver of a light emitting diode (LED) lighting system. In this application, the auxiliary power supply is configured to deliver a specified amount of power to a load (e.g. a sensor, a control module) connected to one or more control leads of the driver. In many LED lighting systems, these same control leads are also used to communicate instructions to one or more circuit modules of the lighting system. In some example configurations, the communication protocol used may be a digital communication protocol where information is transmitted in digital bits.

In a configuration in which multiple auxiliary power supplies are connected in parallel, the maximum total power of the auxiliary power supply may be too high for the loads connected on the auxiliary power supply. For example, in a configuration with current limited auxiliary power supplies that are shorted to enable communication, the connected device may not be able to support the total short circuit current from multiple auxiliary power supplies. In such a scenario, a simple and efficient way to enable, not enable, or disable some of the auxiliary power supplies in the configuration may be useful. Current processes to set the auxiliary power supplies to be enabled, not enabled, or disabled can be time consuming to implement, can lead to mistakes, can require complex manufacturing, and/or can damage hardware components.

SUMMARY

The present disclosure teaches methods, systems, and apparatuses that help mitigate the aforementioned issues. For example, one exemplary embodiment is a system for controlling an auxiliary power supply, where the system includes an auxiliary power supply having an output, and a controller. The controller may be configured to enable the auxiliary power supply if no voltage is sensed at the output of the auxiliary power supply, and may disable (or not enable) the auxiliary power supply if voltage is sensed at the output of the auxiliary power supply. In some embodiments, the controller may define a timeout period, and during the timeout period, the controller may enable the auxiliary power supply if no voltage is sensed at the output of the auxiliary power supply, and disable (or not enable) the auxiliary power supply if voltage is sensed at the output of the auxiliary power supply. After the timeout period, the controller may enable the auxiliary power supply.

Another exemplary embodiment is a method that may be executed by the above-mentioned system, for example. A method may include generating a first random number to define a first time period. During the first time period, the method may detect whether a voltage is present at an output of an auxiliary power supply, may disable (or not enable) the auxiliary power supply when the voltage is detected at the output, and may enable the auxiliary power supply when the voltage is not detected at the output. This method may be repeated where additional random numbers may be used for additional time periods.

Another embodiment may be a system controlling power for a load. The system may include a first power supply that provides a first power for a load, and a second power supply that provides a second power to the load. The system may also include a controller in electrical communication with the second power supply. The controller may define a timeout period based on a random number. During the timeout period: the controller may monitor whether a voltage is present at an output of the second power supply to determine if the first power supply is providing the first power to the load, may enable the second power supply to supply the second power to the load if no voltage is present at the output of the second power supply, and may disable (or not enable) the second power supply if voltage is present at the output of the second power supply.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

In the example embodiments discussed herein, there is provided an auxiliary power supply configured to provide power to a load. While some embodiments are described herein in the context of a light emitting diode (LED) lighting system, one of ordinary skill in the art will readily recognize that featured teachings are applicable to other types of system that use power supplies.

The disclosed embodiments allow a system to ensure that one auxiliary power supply is providing power to a load, while ensuring that not too many auxiliary power supplies are providing power to the load such that the load is overpowered. Further, some embodiments allow a system to deliver an appropriate amount of power to a load such that the load requirements are not underpowered (in the event of a power supply failure, for example) or overpowered (in the event of multiple power supplies simultaneously supplying power, for example). In accordance to some embodiments, this may be achieved sensing if voltage is present at the output of an auxiliary power supply such that the auxiliary power supply outputs power to the load only when appropriate. Voltage being present at the output of the auxiliary power supply may indicate that another power supply is providing power to the load. Lack of voltage at the output of the auxiliary power supply may indicate that no other power supply is providing power to the load. An exemplary implementation is illustrated in FIG. 1 and described in detail hereinafter.

Figure 1:
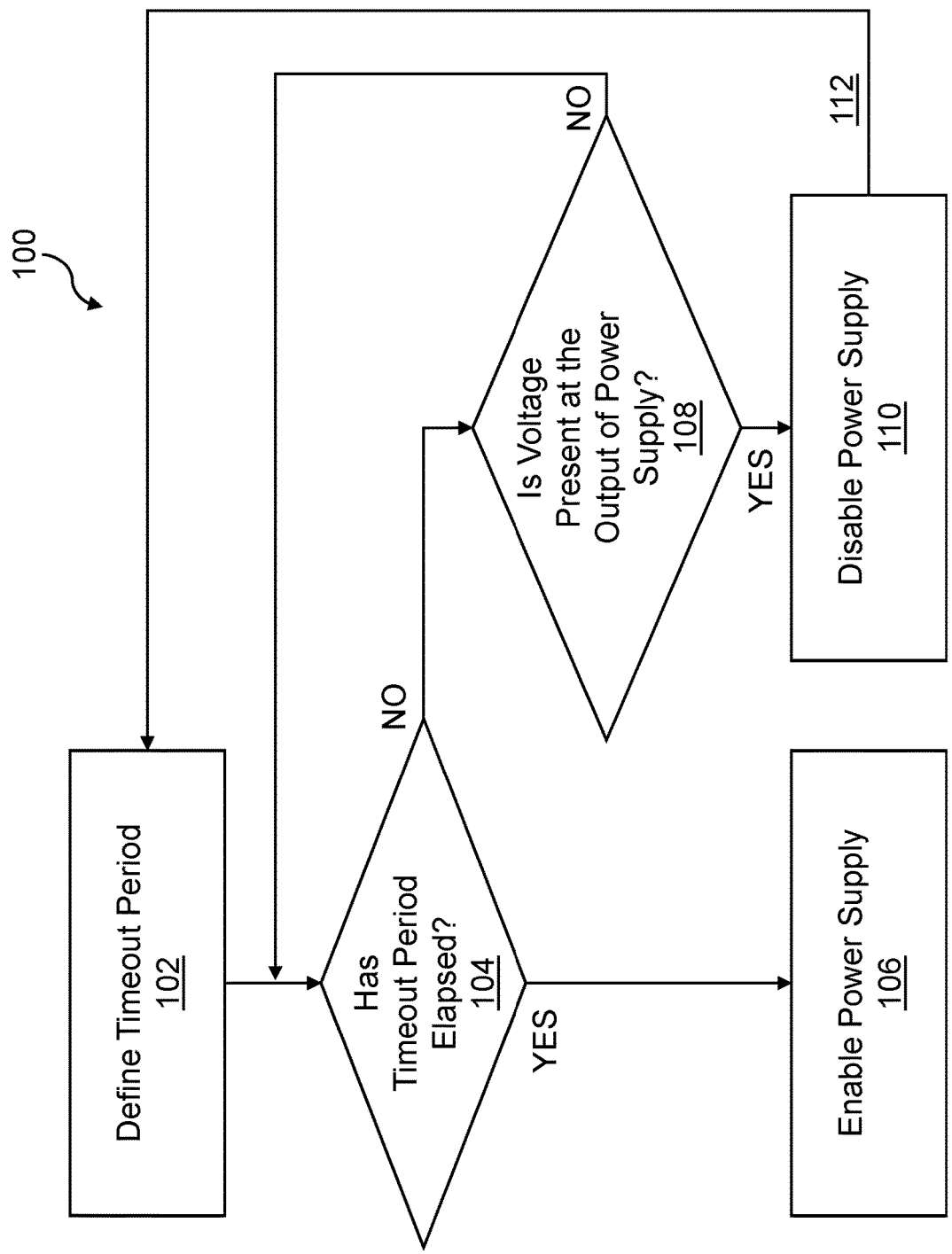
FIG. 1 illustrates a flowchart of a method for controlling an auxiliary power supply in accordance with several aspects described herein.

FIG. 1 illustrates a flow chart of an exemplary method 100 that may be used for controlling power supplied from an auxiliary power supply. The method 100 begins at step 102 by defining a timeout period, which may be any defined time period including a predetermined time period or a dynamically generated time period. The method continues at step 104 by determining if the timeout period has elapsed. If the timeout period has elapsed, the power supply is enabled or switched on at step 106, which allows the delivery of power by the power supply. If the timeout period has not elapsed, the output of the power supply is checked at step 108 to determine if voltage is present at the output. If there is no voltage present at the output, then the method returns to step 102 to again determine if the timeout period has elapsed. At step 110, if a voltage is present at the output of the power supply at step 108, then the power supply is disabled or switched off, which ceases the delivery of power by the power supply, or the power supply is not enabled, which continues the lack of power delivery by the power supply (in the event the power supply was previously not enabled). "Disabling" as used herein may refer to ceasing power output of a power supply (if the power supply is in an "on" state) or maintaining a state of not outputting power by the power supply (if the power supply is in an "off" state).

The timeout period may be defined by a unique number or a random number generated by the controller or received by the controller. The random number may be generated by a random number generator. This may be accomplished by collecting readings from a noisy analog signal or using functions from existing libraries, for example, or using known techniques for generating a random number. In some examples, the timeout period may be in the range of about 0.07 ms to 3000 ms. Other timeout periods may also be implemented.

In some examples where multiple auxiliary power supplies coexist in a system, each auxiliary power supply system may perform method 100 to determine whether to enable or disable or not enable the auxiliary power supply to output or cease power output, respectively.

In some examples, an auxiliary power supply may continuously perform method 100 to constantly make sure that the load is receiving power from some power source (whether that power comes from the auxiliary power supply or some other power source). This is depicted by line 112 in FIG. 1.

In some examples, an auxiliary power supply may perform method 100 once using one timeout period or multiple times using multiple timeout periods. If the method is performed using multiple timeout periods, the same or different timeout period(s) may be defined. For example, the first timeout period may be defined based on a first randomly generated number, the second timeout period may be based on a second, different randomly generated number, and so on. In some cases, the timeout period remains the same regardless of how many times the method 100 is performed.

In some examples, only certain aspects of method 100 may be performed. For example, step 108 may be performed only at the end of a timeout period instead of at one or more times during the timeout period.

Figure 2:
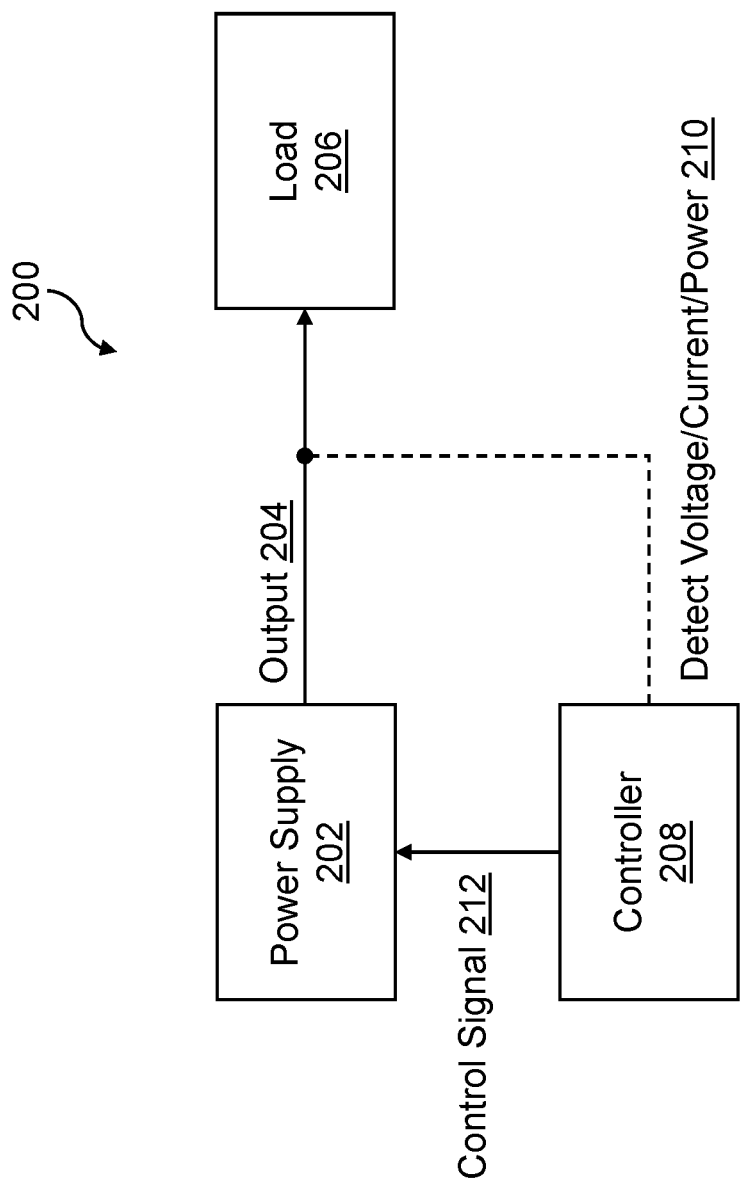
FIG. 2 illustrates a block diagram of a power supply control system in accordance with several aspects described herein.

FIG. 2 illustrates a block diagram of a power supply control system 200 that may be used to control power output by the power supply 202. The power supply 202 may be enabled to produce and output a specified amount of power to a load 206 via an output 204 of the power supply 202. A controller 208 may control the power supply 202 to enable and disable the power supply 202. The controller 208 may enable the power supply 202 by turning the power supply 202 on to generate and/or deliver power. The controller 208 may disable the power supply 202 by turning off the power supply 202 to cease power generation and/or delivery, or may not enable the power supply 202 by maintaining the power supply 202 in a non-enabled state such that power is not generated or delivered. The controller 208 may generate control signal(s) 212, which are transmitted to the power supply 202 to enable and disable (or not enable) the power supply 202. The load 206 may be connected to control leads, which may be internal or external to the power supply 202.

The control signal(s) 212 may be ON/OFF signals to indicate that the power supply 202 should be turned ON and OFF, respectively.

The controller 208 may be electrically coupled to the output 204 of the power supply 202 either directly or indirectly. This allows the controller 208 to detect 210 whether voltage is present at the output 204 of the power supply 202. The controller 208 may detect or determine 210 whether there is a non-zero voltage or no voltage at the output 204. In some examples, the controller 208 itself may not detect or determine the presence of a voltage, but may instead receive data from sensor(s) and/or detector(s) (not shown) indicative of a non-zero voltage or no voltage being present at the output 204.

In some examples, if a non-zero voltage is detected at the output 204, then the amount of detected voltage may be compared to a threshold voltage. The threshold voltage may be predetermined based on the load requirements, for example. Some embodiments may use a threshold voltage of 0.7 V.

In some examples, the controller 208 may detect a current (such as a total system current) or a power (such as a total system power) at the output 204, or may receive data from sensor(s) and/or detector(s) (not shown) indicative of a current or power detected at the output 204. In some examples, the amount of detected current or power may be compared to a threshold current value or a threshold power value. The threshold current or power may be determined based on the load requirements, for example. In some examples, the controller 208 may detect whether a short circuit current is present or a short circuit condition exists.

The controller 208 may interface with the output 204 to sense or detect voltage, current, and/or power present at the output 204 of the power supply 202. This may be accomplished using one or more sensing units (not shown). As such, the presence (or absence) of a voltage, current, and/or power can be detected by the sensing units and subsequently communicated to the controller 208 to initiate the enabling or disabling of the power supply 202. In some embodiments, the presence (or absence) of a voltage, current, and/or power at the output 204 may be directly detected by the controller 208 by way of monitoring a signal level on an internal/local port of the controller 208, where the signal is from the output 204. For example, the port may be configured as a voltage sensing node and electrically, optically, or magnetically coupled to the external control leads in such a way as to sense the voltage thereon.

Figure 3:
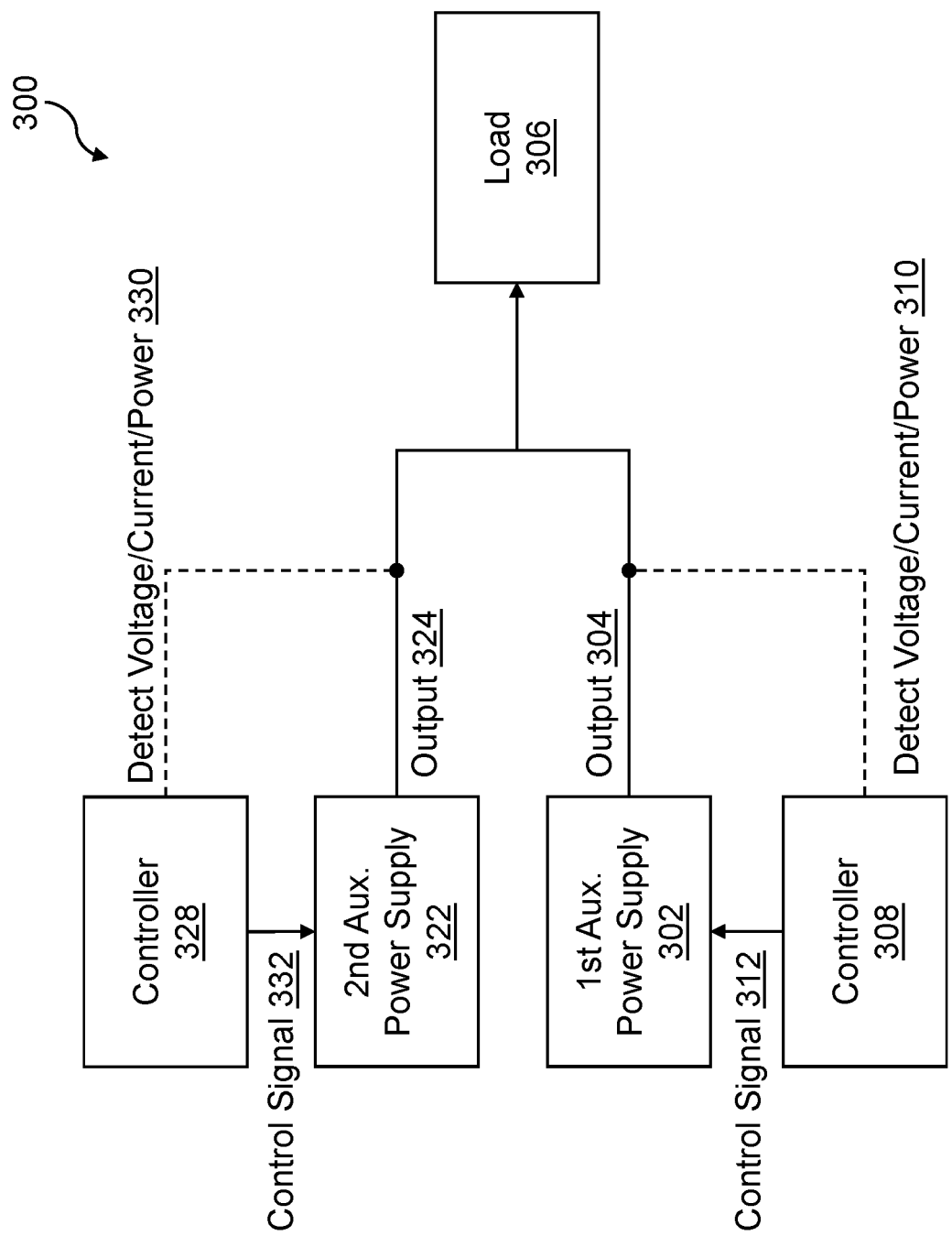
FIG. 3 illustrates a block diagram of another power supply control system in accordance with several aspects described herein.

Like FIG. 2, FIG. 3 illustrates a block diagram of a power supply control system 300 that may be used to control power output by a first auxiliary power supply 302 and a second auxiliary power supply 322. FIG. 3 shows a first auxiliary power supply 302 providing a specified amount of power to a load 306 via an output 304 of the first auxiliary power supply 302. The load 306 is also electrically coupled to an output 324 of a second auxiliary power supply 322 that may also provide a specified amount of power to the load 306 in the event that the first auxiliary power supply 302 fails to provide power to the load 306.

The first auxiliary power supply 302 may be enabled (e.g., turned on) to produce and output a power to a load 306 via output 304 of the first auxiliary power supply 302. Similarly, the second auxiliary power supply 322 may be enabled (e.g., turned on) to produce and output power to the load 306 via output 324 of the second auxiliary power supply 322.

A controller 308 may control the first auxiliary power supply 302 to enable and disable (or not enable) the first auxiliary power supply 302. The controller 308 may enable the first auxiliary power supply 302 by turning the first auxiliary power supply 302 on to generate and/or deliver power. The controller 308 may disable the first auxiliary power supply 302 by turning off the first auxiliary power supply 302 to cease power generation and/or delivery, or not enable the first auxiliary power supply 302 to keep the first auxiliary power supply 302 from generating and delivering power. The controller 308 may generate control signal(s) 312, which are transmitted to the first auxiliary power supply 302 to enable and disable (or not enable) the first auxiliary power supply 302. The load 306 may be connected to control leads, which may be internal or external to the first auxiliary power supply 302.

Similarly, a controller 328 may control the second auxiliary power supply 322 to enable and disable (or not enable) the second auxiliary power supply 322. The controller 328 may enable the second auxiliary power supply 322 by turning the second auxiliary power supply 322 on to generate and/or deliver power. The controller 328 may disable the second auxiliary power supply 322 by turning off the second auxiliary power supply 322 to cease power generation and/or delivery, or not enable the second auxiliary power supply 322 to keep the second auxiliary power supply 322 from generating and delivering power. The controller 328 may generate control signal(s) 332, which are transmitted to the second auxiliary power supply 322 to enable and disable (or not enable) the second auxiliary power supply 322. The load 306 may be connected to control leads, which may be internal or external to the second auxiliary power supply 322.

The control signal(s) 312, 332 may be ON/OFF signals to indicate that the respective auxiliary power supply 302, 322 should be turned ON and OFF, respectively.

The controllers 308, 328 may be electrically coupled to the output 304, 324 of the respective auxiliary power supply 302, 322 either directly or indirectly. This allows the controller 308, 328 to detect 310, 330 whether voltage is present at the output 304, 324 of the respective auxiliary power supply 302, 322. The controller 308, 328 may detect or determine 310, 330 whether there is a non-zero voltage or no voltage at the respective output 304, 324. In some examples, the controller 308, 328 itself may not detect or determine the presence of a voltage, but may instead receive data from sensor(s) and/or detector(s) (not shown) indicative of a non-zero voltage or no voltage being present at the output 304, 324.

The controller 308, 328 may detect a current (such as a total system current) or a power (such as a total system power) at the output 304, 324, or may receive data from sensor(s) and/or detector(s) (not shown) indicative of a current or power detected at the output 304, 324.

The controller 308, 328 may interface with the respective output 304, 324 to sense or detect voltage, current, and/or power present at the output 304, 324 of the respective auxiliary power supply 302, 322. This may be accomplished using one or more sensing units (not shown). As such, the presence (or absence) of a voltage, current, and/or power can be detected by the sensing units and subsequently communicated to the controller 308, 328 to initiate the enabling or disabling of the respective auxiliary power supply 302, 322. In some embodiments, the presence (or absence) of a voltage, current, and/or power at the output 304, 324 may be directly detected by the respective controller 308, 328 by way of monitoring a signal level on an internal/local port of the controller 308, 328, where the signal is from the output 304, 324. For example, the port may be configured as a voltage sensing node and electrically, optically, or magnetically coupled to the external control leads in such a way as to sense the voltage thereon.

The schematic illustrations in FIGS. 2 and 3 illustrate exemplary embodiments of a subsystem that may be implemented as part of a larger auxiliary power supply delivery control system.

Figure 4:
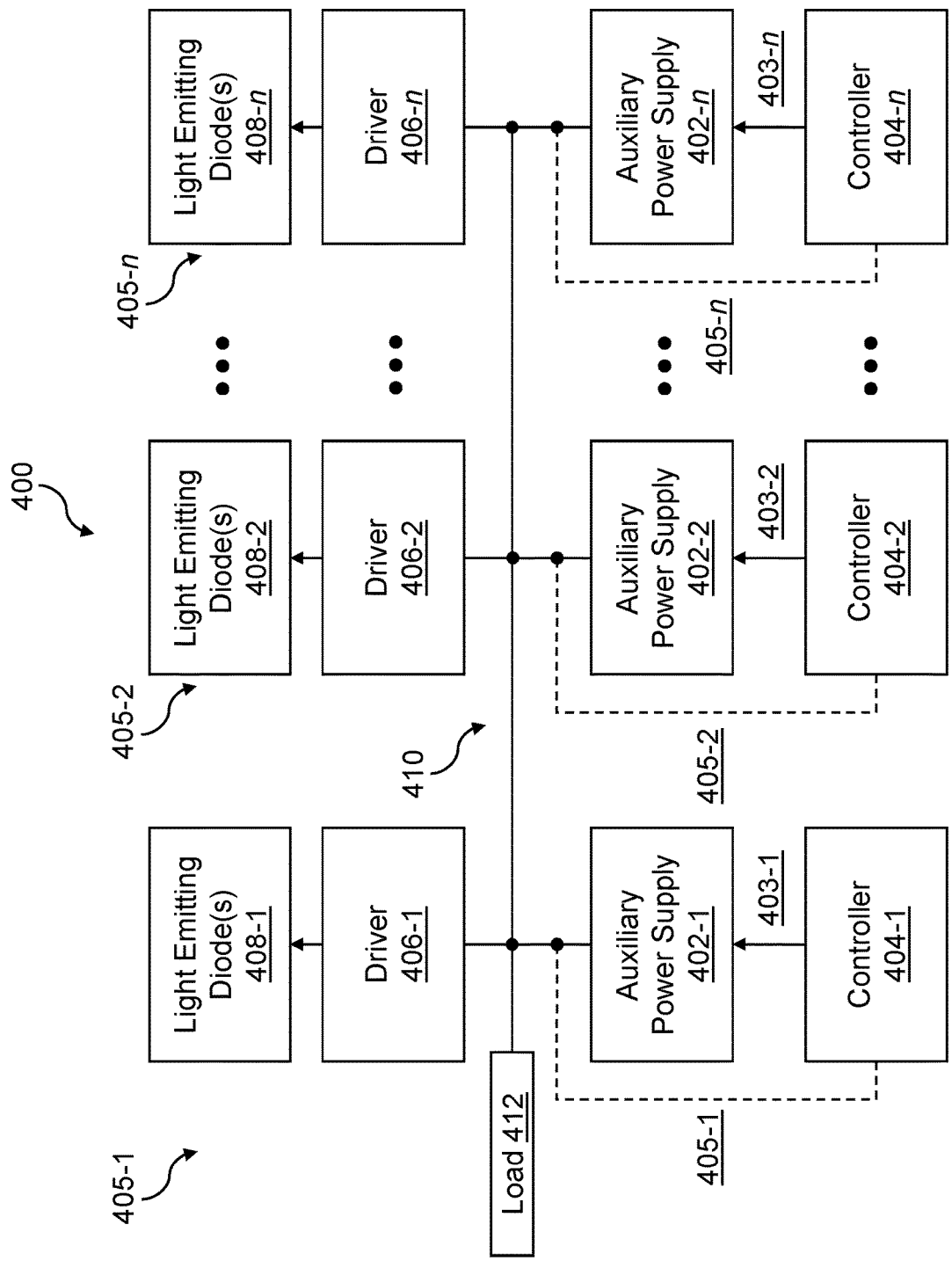
FIG. 4 illustrates a block diagram of a power supply control system of an LED lighting system in accordance with several aspects described herein.

FIG. 4 shows of a power supply control system of an LED lighting system 400. The system 400 includes LED systems 405-1, 405-2, and 405-n. Specifically, FIG. 4 depicts n number of LED systems, where n may be any positive integer. The LED systems 405-1, 405-2, and 405-n may be in electrical communication with a load 412 via an interface 410, such as a Digital Addressable Lighting Interface (DALI) protocol interface. In some examples, interface 410 may be a bus. Examples of load 412 include sensor(s) and control module(s). In some embodiments where the interface 410 is a DALI interface, the load 412 may include DALI-compliant and/or DALI-compatible devices or components electrically connected to the DALI interface.

Each LED system 405-1, 405-2, and 405-n includes LED(s), a driver, an auxiliary power supply, and a controller. The first LED system 405-1 includes LED(s) 408-1, driver 406-1, auxiliary power supply 402-1, and controller 404-1. The second LED system 405-2 includes LED(s) 408-2, driver 406-2, auxiliary power supply 402-2, and controller 404-2. The nth LED system 405-*n* includes LED(s) 408-*n*, driver 406-*n*, auxiliary power supply 402-*n*, and controller 404-*n*.

The auxiliary power supplies 402-1, 402-2, 402-*n* are in communication with respective controllers 404-1, 404-2, 404-*n* and each controller operates according to the exemplary methods described herein. For example, controller 404-1 detects 405-1 whether a voltage is present at the output of auxiliary power supply 402-1. Controller 404-1 may then transmit control signal(s) 403-1 to the auxiliary power supply 402-1 to enable or disable (or not enable) the auxiliary power supply 402-1 based, at least in part, on the detection 405-1 at the output of the auxiliary power supply 402-1. Controllers 404-2 and 404-*n* operate in a similar manner.

In operation, the controllers 404-1, 404-2, 404-*n* allow the load 412 to receive the power it requires for continued operation. Further, the controllers 404-1, 404-2, 404-*n* make sure not to provide power to the load if it is receiving power from another source such as a primary power source or other auxiliary power source.

While FIG. 4 depicts the controllers 404-1, 404-2, 404-*n* as being separate components from the drivers 406-2, 406-2, and 406-*n*, the controllers 404-1, 404-2, 404-*n* may be integrated with or internal to the drivers 406-2, 406-2, and 406-*n* in some examples.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for controlling an auxiliary power supply, the system comprising:
   an auxiliary power supply having an output;
   a controller configured to communicate a first control signal to the auxiliary power supply to enable the auxiliary power supply after expiration of a timeout period if no voltage is sensed at the output of the auxiliary power supply during the timeout period, the controller further configured to communicate a second control signal to the auxiliary power supply to disable the auxiliary power supply if voltage is sensed at the output of the auxiliary power supply during the timeout period.

2. The system of claim 1,
   wherein the controller is further configured to define the timeout period; and
   during the timeout period, the controller monitors the output of the auxiliary power supply.

3. The system of claim 2, wherein the timeout period is defined based on a random number.

4. The system of claim 1, wherein the controller is further configured to sense a current at the output of the auxiliary power supply; and
   the controller configured to communicate the first control signal to the auxiliary power supply to enable the auxiliary power supply after expiration of the timeout period if no current is sensed at the output of the auxiliary power supply during the timeout period, the controller further configured to communicate the second control signal to the auxiliary power supply to disable the auxiliary power supply if current above a threshold is sensed at the output of the auxiliary power supply during the timeout period.

5. The system of claim 1, wherein the controller is further configured to sense a power at the output of the auxiliary power supply; and
   the controller configured to communicate the first control signal to the auxiliary power supply to enable the auxiliary power supply after expiration of the timeout period if no power is sensed at the output of the auxiliary power supply during the timeout period, the controller further configured to communicate the second control signal to the auxiliary power supply to disable the auxiliary power supply if power above a threshold is sensed at the output of the auxiliary power supply during the timeout period.

6. The system of claim 1, further comprising:
   a light emitting diode system having a driver with an auxiliary power supply;
   wherein the auxiliary power supply delivers power to a load when the auxiliary power supply is enabled, and the auxiliary power supply does not deliver power to the load when the auxiliary power supply is disabled.

7. The system of claim 1, further comprising:
   a plurality of light emitting diode systems, each having a driver with an auxiliary power supply, the plurality of light emitting diode systems being electrically connected via a bus;
   wherein the auxiliary power supply delivers power to the bus when the auxiliary power supply is enabled, and the auxiliary power supply does not deliver power to the bus when the auxiliary power supply is disabled.

8. A method for controlling an auxiliary power supply, the method comprising;
   generating a first random number to define a first time period;
   during the first time period:
   detecting whether a voltage is present at an output of a first auxiliary power supply; and
   communicating a second control signal to the first auxiliary power supply to disable the first auxiliary power supply when the voltage is detected at the output of the first auxiliary power supply during the first time period; and
   after an expiration of the first time period, communicating a first control signal to the first auxiliary power supply to enable the first auxiliary power supply when the voltage is not detected at the output of the first auxiliary power supply during the first time period.

9. The method of claim 8, wherein the communicating the second control signal to the first auxiliary power supply to disable the first auxiliary power supply when the voltage is detected at the output of the first auxiliary power supply during the first time period comprises maintaining the first auxiliary power supply as disabled when the voltage is detected at the output of the first auxiliary power supply during the first time period.

10. The method of claim 8, further comprising:
    generating a second random number to define a second time period;
    during the second time period:
    detecting whether a voltage is present at an output of a second auxiliary power supply; and
    communicating a fourth control signal to the second auxiliary power supply to disable the second auxiliary power supply when the voltage is detected at the output of the second auxiliary power supply during the second time period; and
    after an expiration the second time period, communicating a third control signal to the second auxiliary power supply to enable the second auxiliary power supply when the voltage is not detected at the output of the second auxiliary power supply during the second time period.

11. A system for controlling power for a load, the system comprising:
   a first power supply configured to provide a first power to a load;
   a second power supply configured to provide a second power to the load;
   a first controller in electrical communication with the first power supply, the first controller configured to define a first timeout period based on a random number, and during the first timeout period:
   monitoring whether a voltage is present at an output of the first power supply; and
   communicating a first control signal to the first power supply to disable the first power supply from supplying the first power to the load if voltage is present at the output of the first power supply; and
   after the first timeout period, communicating a second control signal to the first power supply to enable the first power supply if no voltage is present at the output of the first power supply during the first timeout period.

12. The system of claim 11, further comprising:
   a second controller in electrical communication with the second power supply, the second controller configured to define a second timeout period based on a random number, and during the second timeout period:
   monitoring whether a voltage is present at an output of the second power supply; and
   communicating a third control signal to the second power supply to
   disable the second power supply from supplying the second power to the load if voltage is present at the output of the second power supply; and
   after the second timeout period, communicating a fourth control signal to the second power supply to enable the second power supply if no voltage is present at the output of the second power supply during the second timeout period.

13. The system of claim 12, wherein the first controller is electrically coupled to the first power supply via one or more control leads, and wherein the second controller is electrically coupled to the second power supply via one or more control leads.

14. The system of claim 11, wherein the load is a sensor.

15. The system of claim 11, wherein the load is a control module.

16. The system of claim 11, wherein the first power supply is configured to deliver power to a sensor, and the second power supply is electrically coupled to the first power supply; and
   the first controller is further configured to:
   communicate, after the first timeout period, the second control signal to the first power supply to enable the first power supply to provide the first power to the sensor if no voltage is present at the output of the first power supply during the first timeout period; and
   communicate, during the first timeout period, the first control signal to disable the first power supply if voltage is present at the output of the first power supply during the first timeout period.

17. The system of claim 11, wherein the first controller is further configured to sense whether a short circuit current is present at the output of the first power supply, and further configured to communicate the first control signal to the first power supply to disable the first power supply if the short circuit current is present at the output of the first power supply during the first timeout period.

* * * * *